(12) United States Patent
Gold

(10) Patent No.: US 10,077,913 B2
(45) Date of Patent: Sep. 18, 2018

(54) ENERGY TRANSFER SYSTEM (ETS)

(71) Applicant: Susan Jane Gold, Horley (GB)

(72) Inventor: Susan Jane Gold, Horley (GB)

( * ) Notice: Subject to any disclaimer, the term of this patent is extended or adjusted under 35 U.S.C. 154(b) by 0 days.

(21) Appl. No.: 15/530,198

(22) Filed: Dec. 13, 2016

(65) Prior Publication Data
US 2018/0135873 A1 May 17, 2018

(30) Foreign Application Priority Data

Nov. 13, 2016 (GB) .................................. 1619192.6

(51) Int. Cl.
| | | |
|---|---|---|
| *F28D 15/00* | (2006.01) | |
| *F24F 5/00* | (2006.01) | |
| *F24F 1/00* | (2011.01) | |
| *F24F 11/30* | (2018.01) | |
| *F24F 11/83* | (2018.01) | |
| *F24F 11/85* | (2018.01) | |
| *F24F 110/10* | (2018.01) | |

(52) U.S. Cl.
CPC .......... *F24F 5/0003* (2013.01); *F24F 1/0007* (2013.01); *F24F 11/30* (2018.01); *F24F 11/83* (2018.01); *F24F 11/85* (2018.01); *F24F 2110/10* (2018.01)

(58) Field of Classification Search
CPC .... F24F 5/0003; F24F 1/0007; F24F 11/0012; F24F 11/08; F24F 2011/0083; F24F 5/0035; F25B 23/006; F28D 1/0226; F28D 1/0233; F28D 1/024; F28D 15/0266; H05K 7/20554
USPC .................................................. 165/104.28
See application file for complete search history.

(56) References Cited

U.S. PATENT DOCUMENTS

| | | | | |
|---|---|---|---|---|
| 4,482,004 A | * | 11/1984 | Grover | F22B 1/165 122/33 |
| 4,621,681 A | * | 11/1986 | Grover | F22B 1/165 122/33 |
| 4,796,439 A | * | 1/1989 | Yamada | F24D 11/0214 62/159 |
| 5,309,725 A | * | 5/1994 | Cayce | F24F 3/1405 62/173 |
| 5,947,111 A | * | 9/1999 | Neulander | F28D 15/0275 122/448.1 |
| 6,109,044 A | * | 8/2000 | Porter | F28D 15/0266 165/104.21 |
| 6,129,141 A | * | 10/2000 | Yang | A61K 9/0031 165/45 |
| 2007/0023163 A1 | * | 2/2007 | Kidwell | F24J 3/084 165/45 |
| 2007/0224929 A1 | * | 9/2007 | Chen | F24F 7/02 454/339 |
| 2008/0029250 A1 | * | 2/2008 | Carlson | F24F 11/0001 165/104.33 |
| 2010/0085708 A1 | * | 4/2010 | Martin | H05K 7/20927 361/696 |
| 2010/0281901 A1 | * | 11/2010 | Kawase | B60H 1/00885 62/238.7 |
| 2011/0289953 A1 | * | 12/2011 | Alston | B60H 1/32 62/238.6 |
| 2013/0299123 A1 | * | 11/2013 | Matula | F24D 11/0221 165/45 |

* cited by examiner

*Primary Examiner* — Justin Jonaitis
(74) *Attorney, Agent, or Firm* — Michael D. Eisenberg

(57) ABSTRACT

Transfer of heat energy from within a building to the outside air by means of fans, heat pipes and circulating water in a closed loop system.

16 Claims, 1 Drawing Sheet

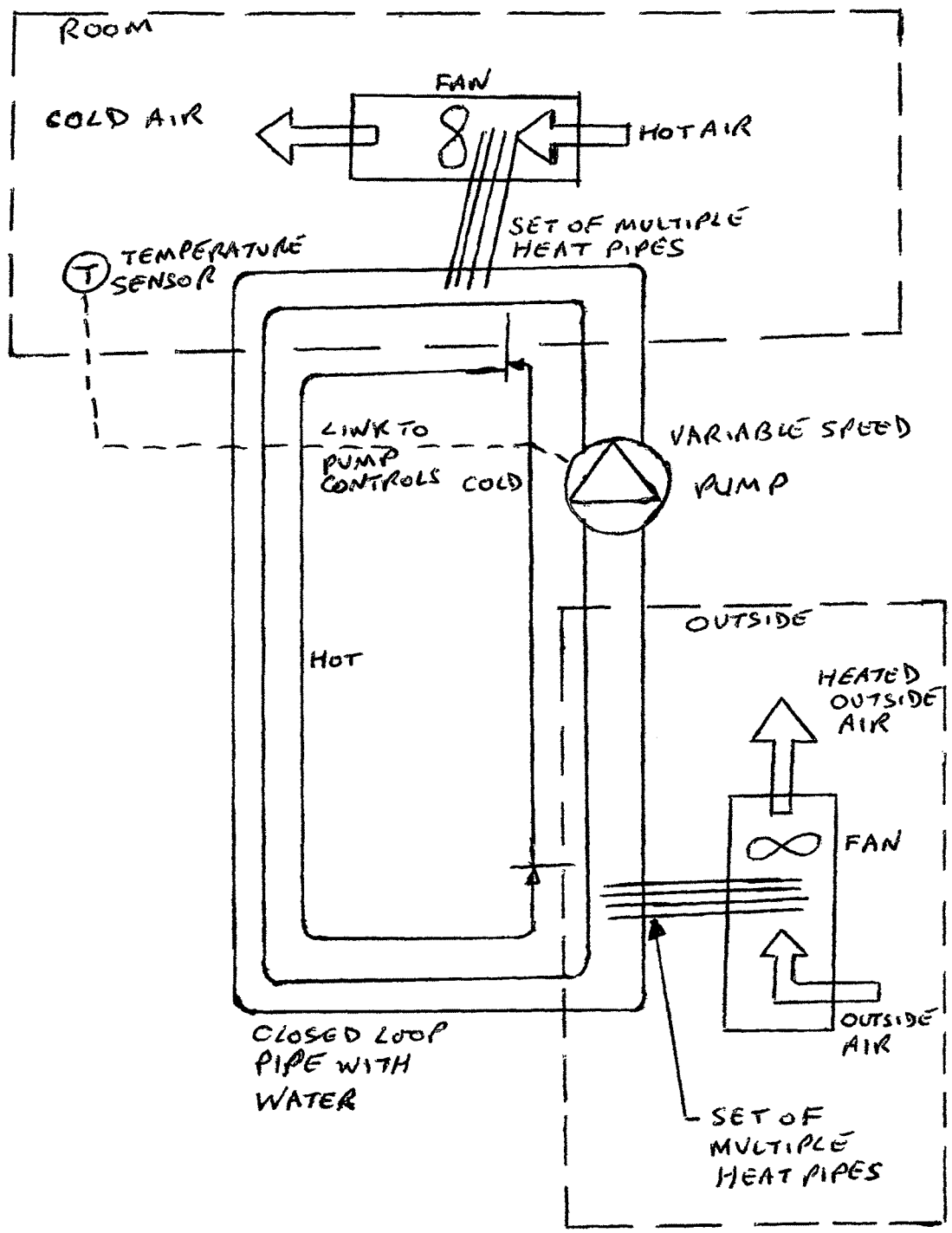

ENERGY TRANSFER SYSTEM (ETS)

TECHNICAL FIELD AND INDUSTRIAL APPLICABILITY OF THE INVENTION

This invention relates to the removal of heat from a room in a building by means of mechanical fans. This present invention uses mechanical fans heat tubes and circulating water in a closed loop system to remove heat from the room and dump to atmosphere; instead of mechanical fans, refrigerant and a compressor in a variable refrigerant volume (VRV) system, or mechanical fans and chilled water.

BACKGROUND TO THE INVENTION

During the summer, rooms in buildings get very hot and a means of cooling these rooms is required to make them more comfortable to be in. Currently fans with a cooling coil using refrigerant (VRV) are used or fans with a cooling coil using chilled water are used. In both cases the heat is removed from the room and dumped into the atmosphere using more fans.

DESCRIPTION OF THE INVENTION

A rectangular box with a fan inside draws hot air from a room and passes it over a set of heat pipes which have one end in the hot air stream and one end in a sealed circulating pipe of cold water. The heat pipes remove heat from the hot air stream and transfer it to the cold water which is then heated up. The cold water which is now hot is pumped to an outside box where another set of heat pipes with one end in the sealed circulating pipe of now hot water remove heat from the hot water and transfer it to air, with a fan drawing the air across the hot heat pipes and blowing the hot air out to atmosphere. The hot water now has all of the heat removed and becomes cold water which is circulated back to the inside box where the cycle is repeated. From the inside box to the outside box the sealed circulating pipe is hot, from the outside box to the inside box the same sealed circulating pipe is cold. A room temperature sensor linked to the pump controls, enables the pump to switch off (no heat removed) once the room is at a set temperature and switch on (heat removed) when the room is above set temperature. The variable speed pump speeds up or slows down the flow of water circulating in the pipe depending on how much heat needs to be removed.

DESCRIPTION OF DRAWING 1-1

Drawing 1-1 shows the typical arrangement as described in section (03) above

What is claimed is:
1. A cooling system, comprising:
    a first box having a fan configured to receive air from a closed space;
    a first set of pipes positioned in an air stream generated by the fan of the first box;
    a sealed pipe configured to circulate water;
    a second set of pipes configured to receive heat from water;
    a second box having a fan configured to receive heat from the second set of pipes;
    a sensor configured to measure temperature;
    a pump configured to pump water from a sealed pipe to the second box;
    wherein each pipe in the first set of pipes has a first end disposed in the first box and a second end disposed in the sealed pipe; and
    wherein each pipe in the second set of pipes has a first end disposed in the sealed pipe and a second end disposed in the second box.
2. The cooling system of claim 1, wherein the first set of pipes is configured to transfer heat from the air to the water in the sealed pipe.
3. The cooling system of claim 1, wherein the second box is configured to circulate water until heat is removed from the water.
4. The cooling system of claim 1, wherein the second set of pipes is configured to transfer heat from water in the sealed pipe to air in the second box.
5. The cooling system of claim 4, wherein the fan of the second box is configured to transfer heat from air disposed in the second box to the atmosphere.
6. The cooling system of claim 5, wherein the second box is configured to circulate water back to the sealed pipe when the water has a temperature cooler than a temperature of the air transferred to the atmosphere.
7. The cooling system of claim 1, wherein water in the sealed pipe has a temperature that is cooler than a temperature of the air received from the first set of pipes.
8. The cooling system of claim 1, wherein the sensor is configured to couple with a plurality of controls on the pump.
9. The cooling system of claim 8, wherein the pump is configured to switch in an off position when the closed space has a temperature at a set number and switch in an on position when the closed space has a temperature above the set number.
10. The cooling system of claim 9, wherein the pump is configured to adjust a circulation speed of water in the sealed pipe.
11. A method for cooling, comprising:
    facilitating air from a closed space into a first box having a fan;
    transferring air through a first set of pipes to a sealed pipe containing water;
    circulating water in the sealed pipe;
    extracting heat from water in the sealed pipe;
    pumping water from the sealed pipe to a second box having a fan;
    transferring heat through a second set of pipes to the second box; and
    releasing heat from the second box to the atmosphere.
12. The method of claim 11, further comprising circulating water having a temperature that is cooler than a temperature of the air.
13. The method of claim 11, further comprising measuring temperature with a sensor disposed in the closed space.
14. The method of claim 13, further comprising coupling the sensor to a plurality of controls on a pump.
15. The method of claim 14, further comprising switching the pump to an off position when the closed space has a temperature at a set number and switching the pump to an on position when the close space has a temperature above the set number.
16. The method of claim 15, further comprising adjusting a circulation speed of water in the sealed pipe.

* * * * *